July 7, 1964

D. F. ELDRIDGE 3,140,361

MAGNETIC HEAD ASSEMBLY

Filed Dec. 30, 1960

DONALD F. ELDRIDGE
INVENTOR.

BY Robert G. Clay
ATTORNEY 3,140,361
Patented July 7, 1964

3,140,361

MAGNETIC HEAD ASSEMBLY

Donald F. Eldridge, Palo Alto, Calif., assignor to Ampex Corporation, Redwood City, Calif., a corporation of California Filed Dec. 30, 1960, Ser. No. 79,814
1 Claim. (Cl. 179—100.2)

This invention relates to magnetic transducers, and particularly to magnetic head assemblies for high resolution and high frequency recording and reproducing.

Widespread efforts have been made in magnetic recording systems to obtain and utilize magnetic head designs which satisfactorily combine resolution, sensitivity and frequency response capabilities with suitably long head wear and life. Resolution capabilities are high when the length increment which a magnetic head requires to effect a complete change of remanent magnetization on the record medium is extremely short. The basic length increment determines the smallest recorded pattern which can satisfactorily be resolved or identified, and the density with which digital or analog information may be recorded. The term "high frequency" is used here to designate frequencies well into the megacycle per second range. The frequency capabilities of a magnetic head assembly are also related to resolution capabilities, because the higher the frequency, the shorter the wave length and the more abrupt the changes which must be made in the magnetization patterns.

These factors illustrate the multitude of problems involved in magnetic head design, which problems are magnified considerably when it is recognized that adequate sensitivity and resolution can be obtained in many instances only when the pole tips of the head assembly are kept in contact with the record surface. Some workers in the art have attempted to secure resolution and high frequency capabilities by using a narrow and shallow gap between the pole tips. The physical contact between the pole tips and the record surface, however, causes the pole tips of the head assembly to wear down rapidly.

It is therefore an object of the present invention to provide a magnetic head assembly having improved resolution and frequency characteristics.

Another object of the present invention is to provide an improved magnetic recording assembly for providing high resolution and high density recordings, while being of relatively simple and economical construction.

A further object of the present invention is to provide a magnetic head assembly which is simple and economically constructed, has long wearing capabilities, and provides high density recording and reproduction of signals.

Magnetic head assemblies in accordance with the present invention utilize pole tips and an intermediate nonmagnetic spacer which are of extremely small dimensions, in a selected direction. In a specific example of such a magnetic head assembly, the body of the head assembly is constituted of hard and long-wearing ceramic material which is nonmagnetic and which has a facing surface in contact with the record surface. The ceramic body is annular in form, and the desired low reluctance magnetic flux path is provided by a thin magnetic member coupled to the inner part of the annulus. The magnetic member includes a pair of pole tips and an intermediate nonmagnetic spacer which terminate flush with the facing surface of the ceramic body. The dimensions of each of the pole tips and the intermediate spacer, in the direction of movement of the record surface relative to the body, are selected to be of approximately the same order of magnitude, and to be substantially less than the shortest wave length to be recorded. With this arrangement, a uniform but limited fringing flux is provided at the gap between the pole tips during recording, so that magnetization patterns of extremely short length may be registered on the record surface. The presence of the hard ceramic body minimizes wear of the pole tips and the nonmagnetic spacer, and as a consequence the electrical efficiency of the head remains substantially the same throughout a long operative period.

A better understanding of the invention may be had by reference to the following description, taken in conjunction with the accompanying drawings, in which.

Figures 1, 2:
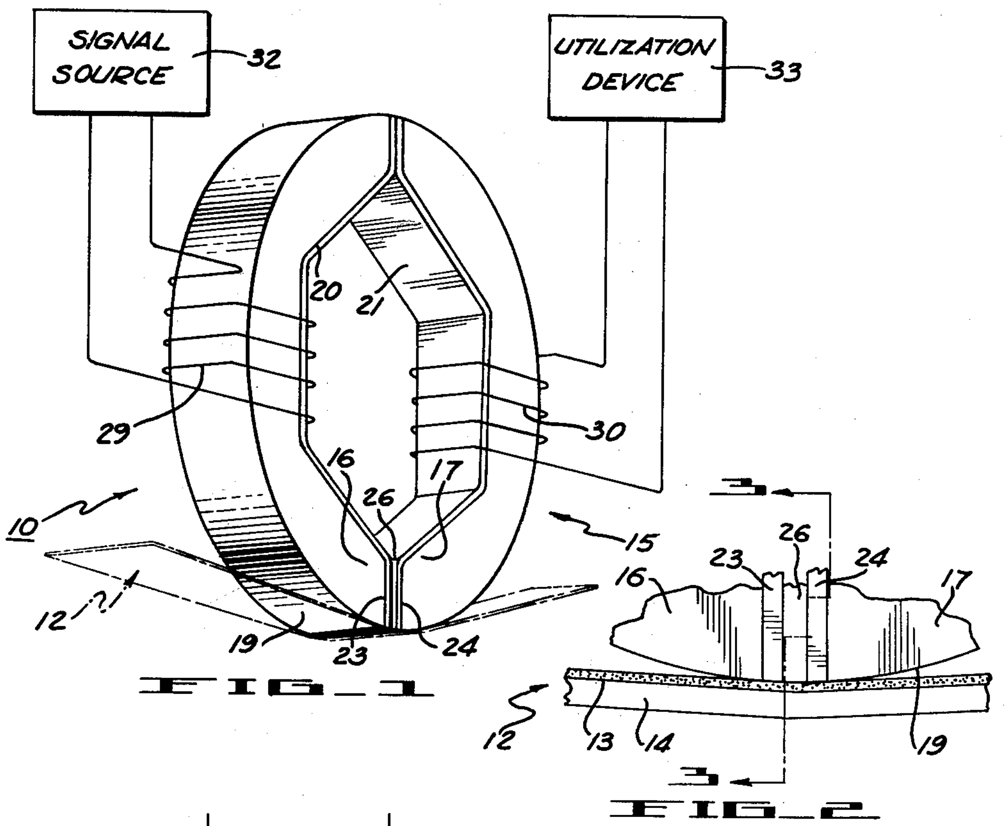
FIG. 1 is an enlarged perspective view of a magnetic head assembly in accordance with the invention, the principal magnetic elements of which have been considerably exaggerated for clarity.
FIG. 2 is a magnified side view of a fragment of the arrangement of FIG. 1, showing more precisely the relationship of the pole tips and a nonmagnetic spacer.
Figure 3:
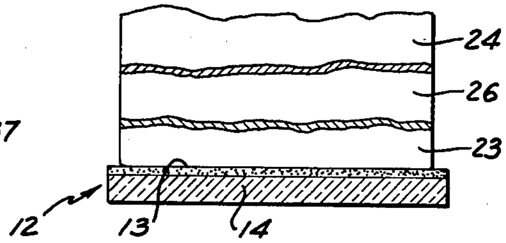
FIG. 3 is an enlarged end sectional view of the fragment shown magnified in FIG. 2, taken along the line 3—3 of FIG. 2 while looking in the direction of the appended arrows.

One form of magnetic head assembly according to the invention, as shown in FIGS. 1 to 3, constitutes a combined recording-reproducing head 10 which is positioned adjacent to and in contact with a magnetic record surface. While the magnetic record surface may be a drum, disk, or the like, the record surface illustrated here is a pliant magnetic tape 12, by way of example. As seen only in the sectional view of FIG. 3, the tape 12 has a magnetic layer 13 of some abrasive quality affixed to a backing member 14. It is assumed that a longitudinal record is to be recorded on or reproduced from the tape 12. The various driving and guiding means for the tape 12 have been omitted in order to simplify the drawing and because such tape driving mechanisms are well known. It will be recognized that the longitudinal recording example is merely one illustration of what may be employed, and that the advantages of magnetic head assemblies in accordance with the invention also apply to video recorders which record signals in transverse tracks on a relatively wide tape in order to facilitate handling of wide band and high frequency signals.

A principal structural component of the magnetic head assembly is an annular ceramic body 15 which forms a hard, non-wearing and nonmagnetic base structure. The ceramic body 15 may be constructed in two half sections 16, 17 in order that critical surfaces which define reference and wearing surfaces may be separately machined, lapped or ground to suitably precise dimensions. A slightly convex facing surface 19 on the body 15 is in contact with the surface of the magnetic tape 12, the facing surface 19 at least partially being in the plane of the tape 12 and the curvature of the surface 19 along the direction of tape 12 movement providing smooth passage of the tape 12 across the surface 19. A substantially, but not fully, complete magnetic loop is provided by a thin magnetic member disposed on the inner surface of the annular ceramic body 15. In the present example, the magnetic loop is defined by a pair of thin strips 20, 21 of ferromagnetic material. However, additional magnetic material having a larger cross sectional area except at the gap area to provide a lower reluctance may be utilized. The magnetic strips 20, 21 are separated by a selected distance at the point of separation of the ceramic body 15, and terminate flush with the facing surface 19 to provide a pair of non-protruding pole tips 23, 24. At the opposite end of the ceramic body 15, the strips 20, 21 are in contact and form a low reluctance magnetic path.

The pole tips 23, 24 which are thus defined are extremely short in the direction of relative movement between the tape 12 and the head assembly. A nonmagnetic gap is defined between the pole tips 23, 24 by a nonmagnetic spacer element 26, which may be a suitable metal such as beryllium copper or a suitable ceramic such as glass, and which may also perform a mechanical function in providing a physically unitary body. The dimension of the nonmagnetic gap is essentially of the same order of magnitude as the dimension of the individual pole tips 23, 24 in the direction of relative movement between the tape 12 and the magnetic head assembly.

As may best be seen in the enlarged side view of FIG. 2, when the magnetic head assembly 10 is in position, the facing surface 19 of the ceramic body 15 is in contact with the oxide or other magnetic layer 13 on the backing material 14 of the tape 12. The pole tips 23, 24 and the nonmagnetic spacer element 26 do not extend outside the facing surface 19, but are flush with the facing surface 19 and at least initially in contact with the oxide coating 13. As is well known, the magnetic particles and other ingredients of a record surface usually are of considerable hardness and some irregularity and accordingly have an abrasive action on the operative elements of magnetic heads with which they come in contact. For recording and reproducing purposes, separate coils 29, 30 are wound about the magnetic strips 20, 21 which form the magnetic loop. The coils 29, 30 derive signals from a signal source 32 and provide output signals to a utilization device 33 respectively.

In the operation of the magnetic head assembly, an individual bit or unit of signal information may be recorded on the tape 12 in an extremely small length. Referring particularly to FIG. 2, it will be seen that the flux (represented by dotted lines) which emanates from the exposed ends of the pole tips 23, 24 because of the presence of the nonmagnetic spacer 26 is confined to an extremely short, but finite, distance in the direction of relative movement of the tape 12. The fringing magnetic flux which links the pole tips 23, 24 and passes through the magnetic layer 13 of the tape 12 is the factor which changes the remanent magnetization of the magnetic layer 13 to effect recording. Resolution is dependent upon the distance in which the field intensity changes from maximum to nearly zero. In pole tip designs heretofore used, small spacers have been employed but the pole tips have been relatively long in the direction of the gap, so that flux has emanated to some degree along a good percentage of the length of the pole tips. With such designs the distance over which the field intensity changes from nearly zero to its maximum is, comparatively, extremely long. In the present arrangement, however, the flux emanates only from the very short lengths of the pole tips 23, 24, and the spacer 26 is also very short, so that the change in field intensity from nearly zero to maximum is accomplished in substantially half of the distance between the outer edges of the pole tips 23, 24.

A number of further advantages accrue from constructions in accordance with the invention. Extremely small areas of pole tip and nonmagnetic spacer are presented through the ceramic body 15 to contact the tape 12. Abrasive contact of the magnetic layer 13 of the tape 12 therefore causes only a very slight wearing of the operative surfaces of the pole tips 23, 24 and the spacer element 26. Thereafter, these elements are not further abraded except as the facing surface 19 of the ceramic body 15 is reduced. This body 15, however, is of extremely hard material and accordingly little affected by wear. Another way in which this relationship may be viewed is to consider that the facing surface 19 has an extremely high areal ratio relative to the pole tips 23, 24 and the nonmagnetic spacer 26. These operative elements accordingly are substantially unaffected by the abrasive action, but at the same time the rate of wear is markedly slowed down.

With this arrangement, therefore, the designer of a magnetic head assembly has acquired freedom in design of the gap shape and depth. If desired, he may (as shown in FIGS. 1 to 3) arrange the pole tips 23, 24 and spacer 26 so that they present a substantially constant configuration relative to the tape during the life of the head assembly. He may also, however, adopt other designs relatively free from the compromises as to gap shape and pole tip shape which are often imposed by considerations of wear.

The advantages of systems in accordance with the invention are also realized in the reproduction of signals recorded on the tape 12. Here it may be noted that what may be termed the area of influence of a magnetization pattern on the tape 12 is limited to the distance from one outer edge of a pole piece 23 or 24 to the center of the spacer element 26. This is the same distance as determines the resolution during the recording phase. Note also, however, that the "effective gap" remains essentially the same during operation.

Heads constructed in accordance with the present invention preferably employ a ceramic material for the annular body 15 and silicon steel for the magnetic strips 20, 21. The body 15 may also be of other nonmagnetic materials. Dimensions for each of the pole tips in the spacer element of less than 0.0005 inch have been employed with the successful result indicated.

Figure 4:
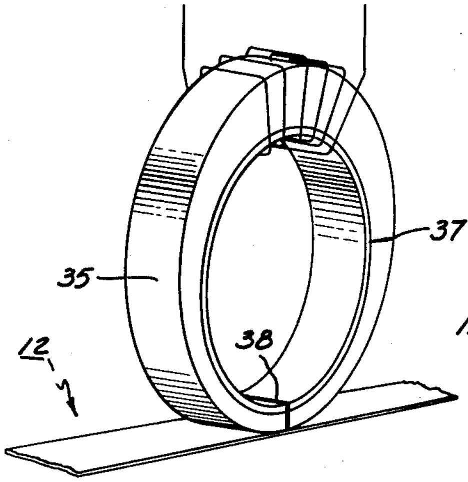
FIG. 4 is an enlarged perspective view of a different arrangement in accordance with the invention.

An alternative embodiment in accordance with the invention is shown in FIG. 4. Here, the main body 35 of the head assembly is a single, substantially annular member of ceramic or other hard material, having a small gap at one side thereof and a facing surface for contact with the magnetic tape as above described. The magnetic flux path for the magnetic head is provided by a vacuum deposited or chemically deposited film 37 of magnetic material on the inner surface of the annular body 35. Through the use of vacuum electro or electroless deposition, even the interior surfaces at the gap in the annulus are uniformly and precisely coated. A nonmagnetic spacer 38 is positioned between the facing films of magnetic material at the gap. As in the arrangement of FIGS. 1 to 3, the dimension of the spacer element 38, and the dimensions of the pole tips formed by the magnetic film 37, are extremely small in the direction of relative movement between the tape and the magnetic head. Again, superior wear and electrical performance are provided.

Thus there has been described an improved magnetic head assembly in which both the pole pieces and the magnetic gap are arranged to be very small in a selected direction, while at the same time an extremely hard wearing surface is provided for direct contact recording and reproduction on a magnetic record medium.

What is claimed is:

A magnetic record transducer for contact operation with a magnetic tape comprising a nonmagnetic ceramic body element of substantially annular form, the body element including a facing surface contacting the magnetic tape and including a central separation in the facing surface, a magnetic member including a pair of thin magnetic strips coupled to the inner surface of the annular ceramic body element, the thin magnetic strips including pole tip elements extending into the separation in the body element to provide pole tips which terminate flush with the facing surface of the body element, the dimension of the pole tips and the spacing between the pole tips in the direction of relative movement between the tape and the body element being substantially less than the smallest wave length to be recorded or reproduced by the transducer, a nonmagnetic spacer element inserted between the pole tips and affixed thereto, the spacer element also terminating flush with the facing surface of the body element, and at least one signal coil encompassing the magnetic mamber in a selected region along its length which is spaced apart from the pole tip region.

References Cited in the file of this patent

UNITED STATES PATENTS

| | | |
|---|---|---|
| 2,674,659 | Buhrendorf | Apr. 6, 1954 |
| 2,895,015 | Zenel | July 14, 1959 |
| 2,911,481 | Augustin | Nov. 3, 1959 |
| 2,914,621 | Donceel | Nov. 24, 1959 |
| 2,939,920 | Leilich | June 7, 1960 |
| 2,941,045 | Connell | June 14, 1960 |